Jan. 28, 1964 E. J. SUPERNOWICZ 3,120,001

MAGNETIC TRANSDUCER

Filed Dec. 8, 1958

*INVENTOR.*
EDWARD J. SUPERNOWICZ
*BY*
Edward A. Robinson
ATTORNEY

United States Patent Office 3,120,001
Patented Jan. 28, 1964

3,120,001
MAGNETIC TRANSDUCER
Edward J. Supernowicz, Santa Clara County, Calif., assignor to International Business Machines Corporation, New York, N.Y., a corporation of New York
Filed Dec. 8, 1958, Ser. No. 778,866
9 Claims. (Cl. 346—74)

This invention relates to magnetic recording, and more particularly to a magnetic pole structure useful in a transducer for recording on magnetic surfaces, and to the methods for making such a pole structure and transducer.

Computer and data processing machines have heretofore stored information upon a magnetic surface by selectively magnetizing various incremental areas or "bits" upon the surface. This may be accomplished by a magnetic transducer positioned closely adjacent to the surface which is then moved relative to the transducer. The transducer produces a magnetic field of varying character which impinges upon the successive incremental areas of the moving recording surface and leaves magnetic impressions thereon according to the variation of magnetic flux. The amount of information which may be recorded upon a given surface area is dependent upon the size of the bits as they are recorded. If the bit size can be materially reduced, then the bit density or the number of bits per unit area may be correspondingly increased to thereby increase the total amount of information which may be recorded in the given area. The bit size is dependent upon the magnetic flux pattern generated by the transducer, and this bit size may be reduced if the magnetic flux from the transducer can be concentrated into a narrow confined area.

As a transducer sweeps over a moving surface, it will record in a track which has a definite width. In practical operation, the transducer may be initially positioned to record information on a particular track, and then at a subsequent time the transducer may be repositioned over that track to reproduce the information previously recorded. While it is desired to minimize the dimensions of the bits in the direction extending longitudinally along the track to permit an increase of the bit density, it is necessary that the track be wide enough to permit a reasonable mechanical tolerance in the positioning of the transducer. Thus, when the transducer is repositioned over a track there may be some degree of positioning error, but if the track is sufficiently wide the information may be reproduced therefrom even though the transducer is not precisely centered thereupon. Therefore, it may be appreciated that an ideal transducer will generate a substantial magnetic flux which will impinge upon a bit area which is narrowly restricted longitudinally of the track or movement of the transducer but which may extend for a substantial distance transversely across the track.

It is an object of this invention to provide an improved magnetic transducer capable of generating magnetic flux concentrated in a narrow pattern not heretofore obtainable.

A further object of this invention is to provide a method for manufacturing an improved magnetic pole piece having an extremely thin dimension, and for manufacturing a magnetic transducer containing such a pole piece and capable of recording information upon a magnetic surface with a small-bit size and a consequential high-bit density.

Briefly stated, according to a preferred form of this invention, a thin magnetic pole piece is fabricated by plating magnetic material upon a surface of a non-magnetic block or body. The block is then incorporated into a transducer and positioned such that the plated surface extends from a larger magnetic core or other magnetic flux generating means and extends into close spaced relation with the magnetic recording surface. The magnetic flux emitted from the principal core will be concentrated through the thin plating on the surface of the block and will then impinge upon the recording surface in a fine line.

Other objects of the invention will be pointed out in the following description and claims and illustrated in the accompanying drawings which disclose, by way of example, the principle of the invention and the best mode which has been contemplated of applying that principle.

Figure 1:
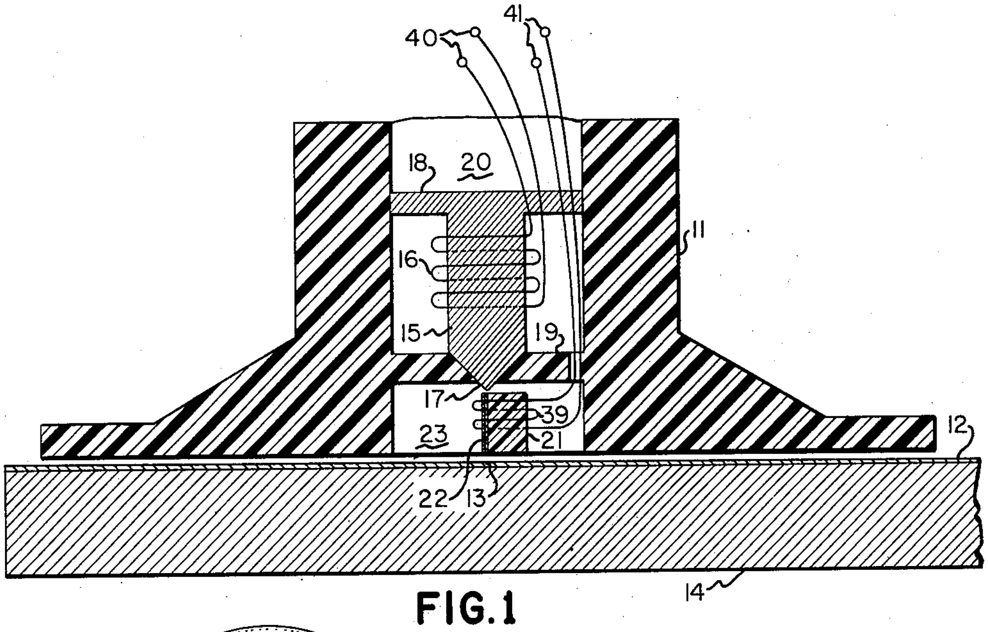
FIG. 1 is a vertical sectional view of a transducer constructed according to the teachings of this invention and positioned over a magnetic surface to record thereupon.

The transducer shown in FIG. 1 includes an external "head" or supporting structure 11 which is shown positioned in recording relation over a magnetic recording surface 12. This transducer is of the vertical probe type which emits magnetic flux in a column impinging perpendicularly into the magnetic surface 12 to form a recorded bit of vertically extending flux vectors in a bit area 13 directly beneath the pole tip of the transducer. The recording surface 12 is of highly retentive magnetic material plated or coated upon a supporting structure 14 composed of a magnetically permeable substance such as soft iron. Thus, the flux from the transducer passes through the recording surface 12 to leave a magnetic image thereon and thence spread out in the permeable material 14 to close again upon the core of the transducer by various diverse paths of weak flux which will not affect any of the other magnetic bits stored in the layer 12.

A principal magnetic core 15 is positioned internally of the transducer body 11 and has a winding 16 linking therewith. The core 15 has a tapered, chisel-like end 17 extending downwardly towards the recording surface 12. The remote end of the core 15 may have a broadened head structure 18 which may function as a collector and return path for the magnetic flux which links the winding 16. The positioning of the principal core 15 may be accomplished by seating the chisel-like end 17 into a tapered slot extending through a web or shelf structure 19 formed integrally with the head structure 11. The core 15 is stablized by forcing the broadened end 18 into the well 20.

Much of the magnetic flux generated by the winding 16 and the principal core 15 is lost by leakage paths curving from one end of the core to the other without passing through the recording surface 12. However, a portion of the generated flux is concentrated and directed to a small bit area 13 by a magnetic flux concentrating means which includes generally a non-magnetic structure or body 21 with a magnetic material 22 (see FIG. 2) plated on the one side thereof. As shown in FIG. 1, the body 21 is positioned within a lower well 23 of the transducer head with the plated side 22 extending between the chisel-like end 17 of the principal core 15 to a point in close proximity with the recording surface for establishing the positioning of the bit area 13. A portion of the magnetic flux emitted from the end 17 of the principal magnet will be concentrated and passed through the plated surface to the bit area 13.

Figure 3:
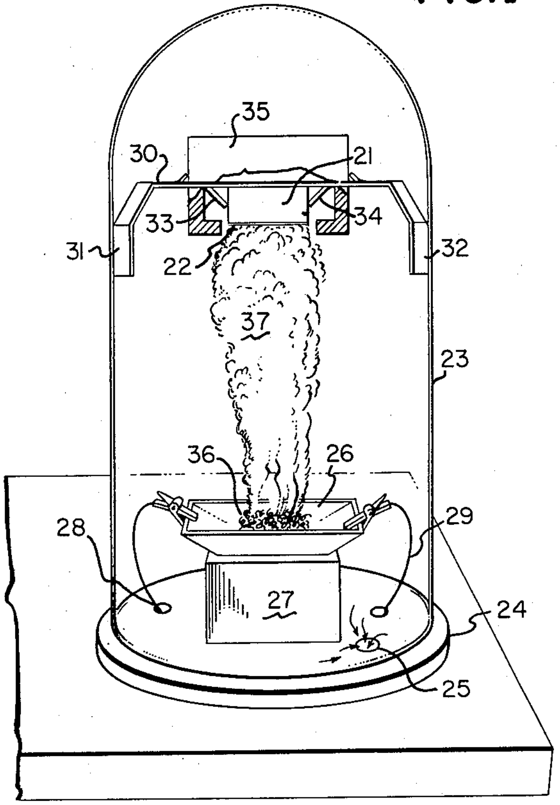
FIG. 3 illustrates a method of vacuum vapor plating of a magnetic material upon the surface of the block shown in FIG. 2.

A suitable plating is obtainable by a process of vacuum deposition as illustrated in FIG. 3. As shown in FIG. 3 the apparatus comprises a bell jar, or any other enclosure which may be evacuated. The bell jar 23 rests upon a base 24 having a vacuum port 25 through which the air may be exhausted as shown by arrows. A crucible or boat 26 rests upon a pedestal 27 within the evacuated chamber. A pair of electrical leads 28 and 29 emerge from the base 24 and are connected to the crucible 26 as a means for heating the crucible. Thus, as illustrated, high frequency current may be passed through the crucible for causing heating thereof. Alternatively, a heating element may be mounted at the top of the pedestal 27 to pass heat by conduction to the crucible 26.

The body 21 may be supported over the crucible 26 by a resilient structure 30 having three outwardly pressing legs of which only 31 and 32 are visible. The legs will frictionally engage against the interior surfaces of the bell jar 23 for support of the structure 30. Spring clips 33 and 34 are provided for frictionally engaging and holding the body 21 to the supporting structure 30. Since it is desirable to plate but one side of the body 21, a box or shield 35 may be fixed to the supporting structure 30 partially enclosing the body 21 and permitting only one side (the bottom) to be exposed.

The plating of the body 21 is accomplished by assembling the apparatus as shown in FIG. 3, evacuating the air from within the bell jar 23, and then heating the crucible 26. Powdered or finely divided magnetic material 36 will be vaporized from the crucible 26 by the heating process, and fumes or vapor of the material 37 will emerge to coat the surfaces within the bell jar. As shown in FIG. 3, a cloud of vapor rises from the crucible 26 to coat the particular desired surface 22 of the non-magnetic body 21.

A magnetic field may be applied to the body 21, during the vapor deposition thereon, to provide a field orientation of the particles being deposited on the surface. This will result in a thin pole piece having a preferred direction of magnetization known in the art as a uniaxial magnetization. The pole piece will then support magnetization in directions along the surface, but will resist magnetization from directions normal to the surface.

Figure 2:
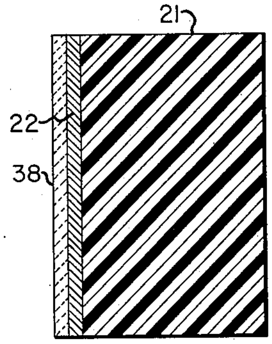
FIG. 2 is an enlarged section of the magnetic pole piece to be incorporated into the transducer of FIG. 1.

After completion of the vacuum vapor plating or sputter coating of a surface of the body 21, the surface may be protected by a further coating of a substance such as lacquer or ceramic 38. Thus, as illustrated in FIG. 2 the body 21 has been prepared for assembly into the transducer 11. A single surface thereof has been coated or plated with a magnetic material 22 while the other surfaces remain bare. While I have described and illustrated a partial cover 35 for preventing plating upon the other surfaces of the body 21, an alternative method would be to permit the deposition of magnetic material on all surfaces of the body, and subsequently to grind or buff away the material from those surfaces where it is not desired.

In the manufacture of transducers, it would be desirable to fabricate a considerable number of the blocks 21 in a single vacuum deposition process. Thus, the supporting structure 30 in the evacuated chamber 23 can be arranged to support many blocks 21 in a side-by-side relation, or otherwise, and thereby gain an economy of manufacture.

As shown in FIG. 1, a second winding 39 encircles the block 21 and thereby links with the thin magnetic pole piece 22. Such a winding may be utilized to reproduce previously recorded signals or bits from the recording surface 12. Thus, as shown in FIG. 1, the winding 16 associated with the principal core 15 may be electrically coupled via the terminals 40 to a "write" amplifier which will supply electrical signals for magnetically recording the data on the surface 12. On the other hand the winding 39 may be coupled via the terminals 41 to a "read" amplifier for reproducing the signals.

Both the winding 16 and the winding 39 may be formed separately and thence may be assembled as shown in FIG. 1. A final step in the manufacture of the transducers would then be to "pot" the pole pieces permanently in place by filling both the wells 20 and 23 with a plastic material which then would form an integral housing with the outer shell 11.

A principal feature in forming a pole piece 22 as a thin plating upon a larger non-metallic body 21 lies in the fact that the body 21 gives mechanical rigidity to the pole pieces 22 and thereby permits the dimension of the pole piece 22 to be extremely thin. In a practical application of this transducer it is contemplated that the pole piece will be less than one-thousandth of an inch in thickness and will be incorporated in a transducer which glides on a film of air such that the distance from the pole piece 22 to the recording surface 12 is of the order of one-thousandth of an inch. Such a thin member would be unmanageable since it would be too weak to mechanically support itself during the manufacture of the transducer. Thus, it may be appreciated, that when the pole piece constitutes a thin plating of a larger body it gives mechanical strength to the structure, even though the magnetic thickness of the pole piece may be very slight.

The foregoing description and drawing discloses a method for plating by vapor deposition in a vacuum, but it will be appreciated that other methods may be used for obtaining a thin plating or coating upon a surface of the body 21. Therefore, it is not intended that this invention be limited to any particular plating method.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic transducer comprising a principal probe type magnetic core, a winding linked inductively with said core and a flux concentrating pole piece, said core having an end which tapers into a chisel-like point, said pole piece being formed by depositing upon a non-magnetic body a thin film of low reluctance magnetic material for attenuating the flux from said core in its recording-passage to the medium, said body being positioned such that the plated surface extends from the chisel-like point of the principal magnetic core toward the magnetic record in writing-relationship therewith.

2. A magnetic transducer adapted for vertical recording upon a magnetic record medium comprising a magnetic flux producing means and a flux concentrating means, said flux concentrating means being a magnetic pole piece positioned intermediate said flux producing means and said record medium for accurately directing flux thereonto, said pole piece comprising a non-magnetic body having one surface plated with a magnetic material, said magnetic material being arranged to shunt the magnetic flux onto the magnetic record in an attenuated, concentrated form, said flux producing means being a core with a winding thereon, positioned in spaced relation with the plated surface.

3. A transducer for magnetically coacting with a recording surface, said transducer comprising a supporting head, a probe type magnetic flux generating means adapted for vertical recording, and separated therefrom in the recording-flux path between said generating means and said recording surface, a magnetic flux concentrating means, and magnetic flux generating means including a magnetic core with a winding thereon, said core and said winding being supported within the head and positioned to direct the generated flux normal to said recording surface, said flux concentrating means including a light non-magnetic body having one surface thereof plated with low reluctance magnetic material, said body being supported within the head such that the plated surface is aligned with the magnetic core and extends into close spaced recording relation with the recording surface.

4. A transducer comprising: a supporting structure; a vertical recording pole piece and its associated winding; and a vertical recording probe type core and its associate winding; the pole piece being positioned within the supporting structure to extend to a point in close recording proximity to a recording surface and to be substantially perpendicular to said recording surface, said pole piece constituting a by-part magnetic-shunting flux-attenuator comprising a light, non-magnetic body and, deposited thereon, a thin film of low reluctance, shunting magnetic material, and the core being remotely positioned within said supporting structure and remote from said recording surface.

5. A magnetic recording combination comprising:

magnetic flux generating means of the vertical recording type;

a magnetic recording medium, said medium comprising a base portion of high magnetic permeability and, overlying said base portion and co-extensive therewith, a record portion comprising a thin layer of high magnetic retentivity material adapted to record the traversal of said magnetic flux without the spreading thereof; and flux shaping means disposed separate from and intermediate said flux generating means and said record medium in flux-attenuating, writing-relationship thereto and comprising a light non-magnetic body and, deposited on one vertical surface thereof, a thin film of low reluctance flux shunting material.

6. The combination as recited in claim 5 wherein said flux generating means comprises a T-shaped core around which is inductively wound a magnetizing conductor and having a tapered flux-concentrating head portion disposed adjacent said shaping means and separated therefrom.

7. The combination as recited in claim 6 wherein said non-magnetic body is disposed intermediate the apex of said tapered T-shaped head and said record medium so that the flux path between said head and said medium is shunted and attenuated by said low reluctance thin film, said thin film being disposed along said path and being of the order of no more than a few thousandths of an inch thick.

8. The combination as recited in claim 7 wherein said thin film shunting material comprises low reluctance magnetic material deposited by thin-film-deposition means directly upon and normal to one surface of said body, conforming to the surface configuration thereof.

9. Magnetic recording means comprising:

a core of the vertical recording type, a magnetic recording medium separated a distance from one end of said core, and flux shaping means intermediate said end and said medium and separate therefrom, said shaping means comprising a non-magnetic body and, deposited on one surface thereof, a thin film of low reluctance material arranged to attenuatedly direct the flux from said core to said medium whereby to write thereon.

References Cited in the file of this patent

UNITED STATES PATENTS

| | | |
|---|---|---|
| 2,674,659 | Buhrendorf | Apr. 6, 1954 |
| 2,749,609 | Francis | June 12, 1956 |
| 2,796,359 | Speed | June 18, 1957 |
| 2,804,506 | Schurch et al. | Aug. 27, 1957 |
| 2,822,533 | Duinker | Feb. 4, 1958 |
| 2,881,518 | Toulmin | Apr. 14, 1959 |
| 2,891,236 | Eisenberg | June 16, 1959 |
| 2,941,045 | Connell | June 14, 1960 |
| 2,947,592 | Naiman | Aug. 2, 1960 |

FOREIGN PATENTS

| | | |
|---|---|---|
| 844,674 | Germany | July 24, 1952 |